(12) United States Patent
Li

(10) Patent No.: US 8,528,522 B2
(45) Date of Patent: Sep. 10, 2013

(54) SUPERIMPOSED PRESSURE CONTROL OF THE COMMON RAIL SYSTEM

(75) Inventor: Hui Li, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 303 days.

(21) Appl. No.: 12/989,477

(22) PCT Filed: Mar. 23, 2009

(86) PCT No.: PCT/EP2009/053357
§ 371 (c)(1),
(2), (4) Date: Oct. 25, 2010

(87) PCT Pub. No.: WO2009/132898
PCT Pub. Date: Nov. 5, 2009

(65) Prior Publication Data
US 2011/0041808 A1 Feb. 24, 2011

(30) Foreign Application Priority Data
Apr. 29, 2008 (DE) .......................... 10 2008 021 384

(51) Int. Cl.
*F02M 69/46* (2006.01)
*F02D 41/00* (2006.01)

(52) U.S. Cl.
USPC .......................................... 123/456; 701/102

(58) Field of Classification Search
USPC ................. 123/333, 446, 447, 456–458, 495; 701/102–104, 106, 114
See application file for complete search history.

(56) References Cited

U.S. PATENT DOCUMENTS

| | | | | |
|---|---|---|---|---|
| 5,941,214 A | 8/1999 | Hoffmann et al. | ............ | 123/456 |
| 6,067,963 A * | 5/2000 | Oi et al. | .................. | 123/458 |
| 7,163,001 B2 * | 1/2007 | Jung et al. | .................. | 123/458 |
| 7,389,767 B2 | 6/2008 | Kasbauer et al. | ............ | 123/457 |
| 2006/0024344 A1 | 2/2006 | Matos et al. | .................. | 424/405 |
| 2007/0251506 A1 * | 11/2007 | Li et al. | .................. | 123/478 |
| 2009/0200865 A1 * | 8/2009 | Grossner et al. | ............ | 307/10.1 |
| 2010/0138135 A1 * | 6/2010 | Hacker et al. | ................ | 701/102 |
| 2010/0269794 A1 | 10/2010 | Li et al. | .................. | 123/495 |
| 2010/0275882 A1 * | 11/2010 | Kobayashi et al. | .......... | 123/447 |
| 2011/0041808 A1 | 2/2011 | Li | .................. | 123/456 |

FOREIGN PATENT DOCUMENTS

| | | |
|---|---|---|
| DE | 19618932 A1 | 11/1997 |
| DE | 10318827 | 2/2004 |
| DE | 10318827 A1 | 2/2004 |
| DE | 102006018164 | 8/2007 |

(Continued)

OTHER PUBLICATIONS

International Search Report and Written Opinion for Application No. PCT/EP2009/053357 (12 pages), Jul. 17, 2009.

(Continued)

*Primary Examiner* — John T. Kwon
*Assistant Examiner* — Johnny Hoang
(74) *Attorney, Agent, or Firm* — King & Spalding L.L.P.

(57) ABSTRACT

In a method and a device for the pressure control of a common rail injection system of an internal combustion engine, typically a volume flow control valve regulating mode is carried out. During the performance of the volume flow control valve regulating mode, a pressure control valve regulating mode is activated, if necessary, and temporarily carried out in order to achieve improved pressure control behavior in this way, particularly during dynamic processes.

12 Claims, 3 Drawing Sheets

(56) References Cited

FOREIGN PATENT DOCUMENTS

| | | |
|---|---|---|
| WO | 01/44638 A2 | 6/2001 |
| WO | 0144638 | 6/2001 |
| WO | 2005001264 | 1/2005 |
| WO | 2009074399 | 6/2009 |
| WO | 2009/132898 A1 | 11/2009 |

OTHER PUBLICATIONS

German Office Action, German Patent application No. 10 2008 021 384.5-13, 2 pages, Feb. 3, 2009.

Chinese Office Action, Application No. 200980115382.X, 19 pages, Oct. 15, 2012.

\* cited by examiner

# US 8,528,522 B2

SUPERIMPOSED PRESSURE CONTROL OF THE COMMON RAIL SYSTEM

CROSS-REFERENCE TO RELATED APPLICATIONS

This application is a U.S. National Stage Application of International Application No. PCT/EP2009/053357 filed Mar. 23, 2009, which designates the United States of America, and claims priority to German Application No. 10 2008 021 384.5 filed Apr. 29, 2008, the contents of which are hereby incorporated by reference in their entirety.

TECHNICAL FIELD

The present invention relates to a method for pressure control of a common rail injection system of an internal combustion engine, comprising a high-pressure pump for delivering fuel to a common rail fuel accumulator connected to an injector, a volume control valve which is disposed upstream of the high-pressure pump and with which a volume flow of fuel through said volume control valve into the high-pressure pump can be adjusted, and a pressure control valve downstream of the high-pressure pump, wherein pressure control is performed via a volume control valve (VCV) closed-loop control mode or a pressure control valve (PCV) closed-loop control mode depending on the respective operating point.

The invention also relates to a method for carrying out such a method.

BACKGROUND

For injecting fuel into combustion chambers of an internal combustion engine, in particular a diesel engine, injection systems are used which in recent years have been increasingly implemented as so-called common rail systems. In these systems, the injectors disposed in the combustion chambers are supplied with fuel from a shared accumulator or common rail, the fuel to be injected being present in the accumulator at a pressure of up to 2000 bar.

Increasingly exacting requirements are being placed on the accuracy of the injection pressure of such injection systems for internal combustion engines which is required for injecting fuel into the engine's combustion chambers. Corresponding pressure control methods are therefore becoming increasingly important.

DE 10 2006 018 164 B3 discloses a method for pressure control of a common rail injection system of the type referred to in the introduction. With this known method, the volume flow of fuel into the high-pressure pump is adjusted using a volume control valve upstream of the high-pressure pump. Pressure control is performed via a pressure control valve disposed downstream of the high-pressure pump. Only one control mode is possible, i.e. either a volume control valve (VCV) closed-loop control mode or a pressure control valve (PCV) closed-loop control mode.

If pressure control is carried out via a volume control valve (VCV) closed-loop control mode as a function of the respective operating point, large overshoots must always be taken into account in transient phases, e.g. on the overrun or in the event of negative setpoint gradients, because the volume control valve or more precisely the high-pressure pump is very sluggish. This is obviously detrimental to the pressure control response.

SUMMARY

According to various embodiments, a method of the type referred to in the introduction can be created, with which a particularly good pressure control response can be achieved particularly in the case of dynamic processes.

According to an embodiment, in a method for pressure control of a common rail injection system of an internal combustion engine, comprising a high-pressure pump for delivering fuel to a common rail accumulator connected to an injector, a volume control valve which is disposed upstream of the high-pressure pump and with which a volume flow of fuel through said volume control valve into the high-pressure pump can be adjusted, and a pressure control valve downstream of the high-pressure pump, pressure control is performed via a volume control valve closed-loop control mode or a pressure control valve closed-loop control mode depending on the respective operating point, characterized in that PCV closed-loop control mode is activated and briefly executed as and when required during execution of VCV closed-loop control mode.

According to a further embodiment, PCV closed-loop control mode may normally be deactivated and only operated as offset control during VCV closed-loop control mode. According to a further embodiment, switchover from offset control to PCV closed-loop control mode may take place as and when required during VCV closed-loop control mode.

According to another embodiment, a device for carrying out the method as described above may comprise a pressure control unit which activates and briefly executes PCV closed-loop control mode as and when required during VCV closed-loop control mode.

According to a further embodiment of the device, the pressure control unit deactivates PCV closed-loop control mode and only operates it as offset control during VCV closed-loop control mode. According to a further embodiment of the device, the pressure control unit may switch from offset control to PCV closed-loop control mode as and when required during VCV closed-loop control mode. According to a further embodiment of the device, the pressure control unit may have a common rail pressure coordination block which selects VCV closed-loop control mode or PCV closed-loop control mode depending on an operating point. According to a further embodiment of the device, the pressure control unit may possess a pressure control valve coordination block which switches from offset control to PCV closed-loop control mode and vice versa. According to a further embodiment of the device, the pressure control valve coordination block may have a switch with ramp or exponential transition.

BRIEF DESCRIPTION OF THE DRAWINGS

The invention will now be explained in detail with reference to an exemplary embodiment in conjunction with the accompanying drawings in which.

DETAILED DESCRIPTION

According to various embodiments, pressure control valve (PCV) closed-loop control mode is briefly activated and executed as and when required while volume control valve (VCV) closed-loop control mode is being executed.

In the method according to various embodiments, PCV closed-loop control is therefore briefly activated in VCV closed-loop control mode. This activation does not make the pressure control system unstable, but produces if necessary, particularly in transient phases, a very rapid pressure reduction to the setpoint value, as PCV closed-loop control has a much higher dynamic range than VCV closed-loop control. The method according to various embodiments, therefore enables a particularly good pressure control response to be achieved for dynamic processes.

It is always attempted if possible to control the pressure via the VCV closed-loop control mode. This ensures better energy efficiency of the hydraulic system. According to various embodiments, PCV closed-loop control is activated and briefly executed as and when required during said VCV closed-loop control mode.

Briefly activating PCV closed-loop control in VCV closed-loop control mode does not make the pressure control system unstable.

In an embodiment, during VCV closed-loop control mode, PCV closed-loop control mode is normally deactivated and is only operated as offset control (PCV offset). In this case PCV control therefore only operates open-loop in VCV closed-loop control mode. In this embodiment, switchover from PCV offset to PCV closed-loop control mode takes place as and when required during VCV closed-loop control mode.

According to another embodiment, a device may carry out the method described above. The device has a pressure control unit which activates and briefly executes PCV closed-loop control mode as and when required during VCV closed-loop control mode.

Preferably, the pressure control unit normally deactivates PCV closed-loop control mode during VCV closed-loop control mode and operates it only as open-loop offset control (PCV offset). The pressure control unit switches from PCV offset to PCV closed-loop control mode as and when required during VCV closed-loop control mode and vice versa.

The pressure control unit preferably has a common rail pressure coordination block which selects a VCV closed-loop control mode or a PCV closed-loop control mode depending on an operating point. The pressure control unit also preferably contains a pressure control valve coordination block which switches from PCV offset to PCV closed-loop control mode and vice versa. For this purpose the pressure control unit expediently has a switch with ramp or exponential transition.

Figure 1:
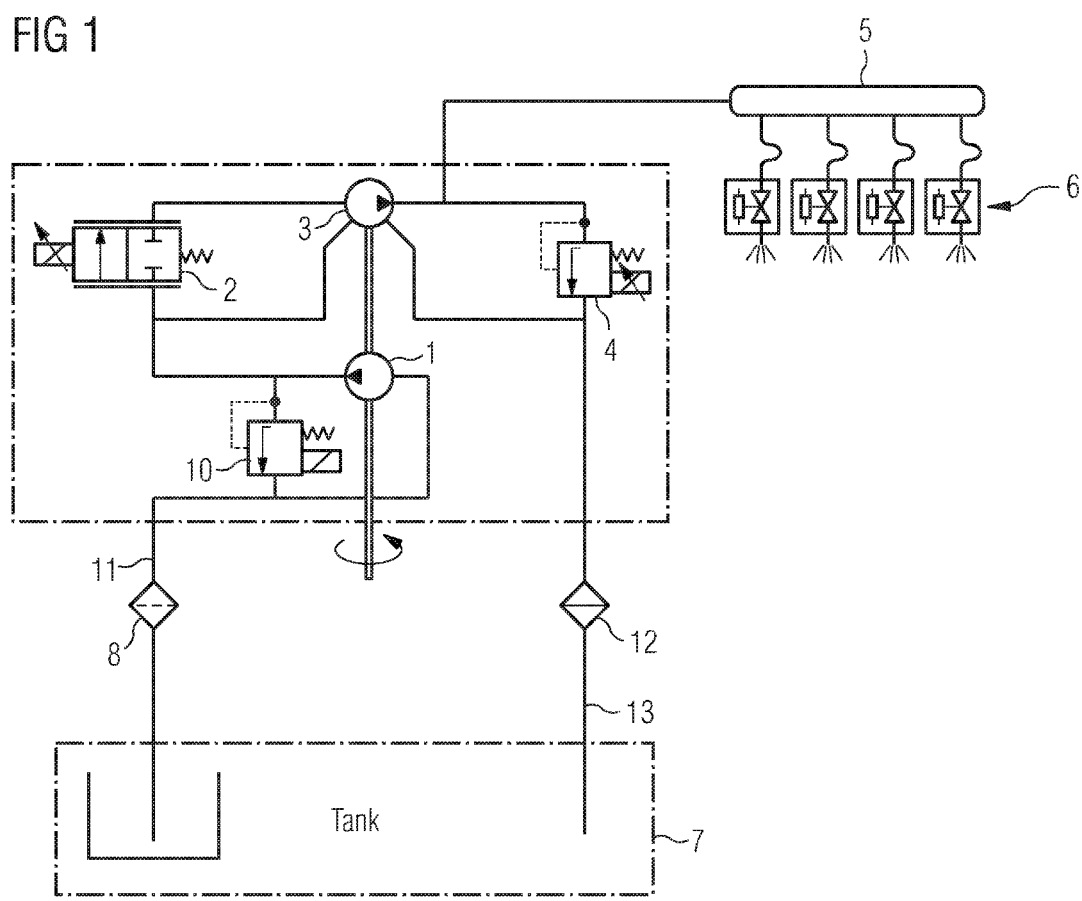
FIG. 1 schematically illustrates a common rail injection system.
Figure 2:
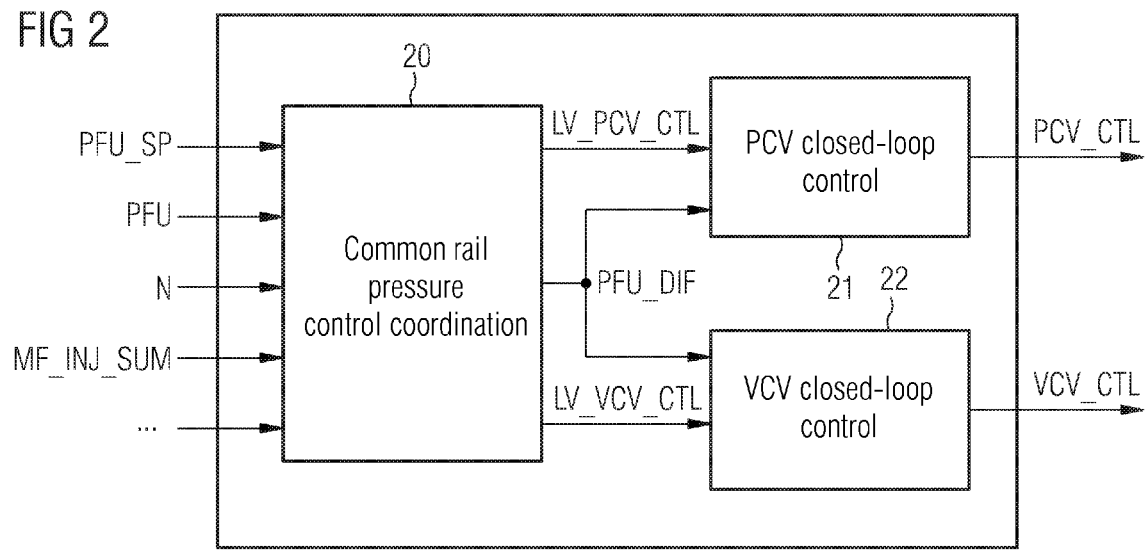
FIG. 2 shows a block diagram of part of a pressure control unit.

The injection system schematically illustrated in FIG. 1 comprises a fuel tank 7 from which a feed line 11 leads via a filter 8 to a fuel pre-pump 9. Connected in parallel with the pre-pump 9 is a primary pressure control valve 10. The feed line 11 then passes through a volume control valve 2 with which a volume flow of fuel in a downstream high-pressure pump 3 can be adjusted. The high-pressure pump 3 supplies the fuel to a common rail accumulator 5 connected to various injectors 6.

Disposed upstream of the high-pressure pump 3 in a fuel return line 13 is a pressure control valve 4. The returned fuel is fed through the return line 13 back to the fuel tank 7 via a filter 12.

For pressure control of said common rail injection system, a pressure control unit (not shown) is connected which, depending on an operating point, executes either a VCV closed-loop control mode in which the volume control valve 2 is adjusted accordingly, or a PCV closed-loop control mode in which the pressure control valve 4 is adjusted. For this purpose the pressure control unit has a common rail pressure control coordination block 20 which decides, depending on the operating point, which type of control is active. PCV closed-loop control is denoted by 21, while VCV closed-loop control is denoted by 22.

The pressure control unit always endeavors to control the pressure of the injection system via VCV closed-loop control 22. In this mode, PCV control operates in open-loop mode only, i.e. PCV closed-loop control is offset control in this case.

Figure 3:
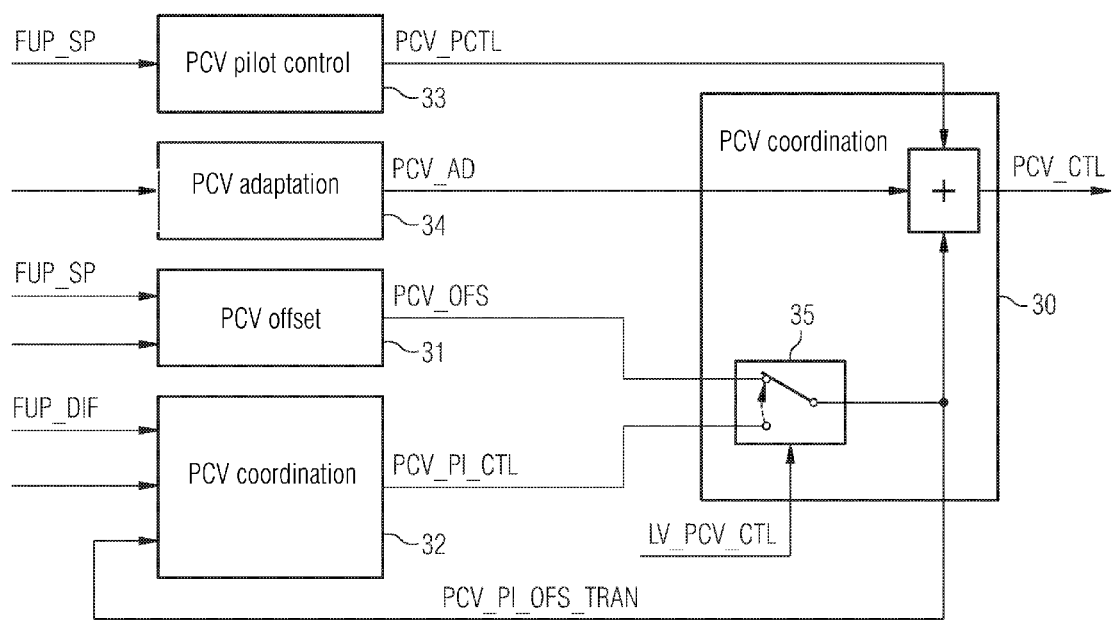
FIG. 3 shows a block diagram of another part of a pressure control unit.

FIG. 3 shows that the pressure control unit possesses a pressure control valve coordination block 30 which switches as and when required from offset control (PCV offset) 31 to PCV closed-loop control mode 32 and vice versa. When PCV closed-loop control mode 32 is deactivated, PCV control is offset control 31 which is composed of PCV_PCTL (pressure control valve pilot control 33), PCV_AD (pressure control valve adaption 34) and PCV offset.

The corresponding switchover from offset control 31 to PCV closed-loop control mode 32 is effected via a switch 35 with ramp or exponential transition.

What is claimed is:

1. A method for pressure control of a common rail injection system of an internal combustion engine, comprising a high-pressure pump for delivering fuel to a common rail accumulator connected to an injector, a volume control valve (VCV) which is disposed upstream of the high-pressure pump and configured for adjusting a volume flow of fuel through said volume control valve into the high-pressure pump, and a pressure control valve (PCV) downstream of the high-pressure pump, the method comprising:

using a processor to implement a VCV closed-loop control mode for controlling the pressure of fuel in the common rail injection system, wherein in the VCV closed-loop control mode the VCV is controlled in a closed-loop control manner and the PCV is controlled in an open-loop control manner;

upon detecting a predefined operating point of the internal combustion engine, automatically activating a switch to activate a PCV closed-loop control mode while in the VCV closed-loop control mode, wherein both the PCV and the VCV are controlled in a closed-loop control manner;

upon achieving a desired pressure control according to the PCV closed-loop control mode, automatically activating the switch to deactivate the PCV closed-loop control mode, thereby returning to the VCV closed-loop control mode, wherein the VCV is controlled in a closed-loop control manner and the PCV is controlled in an open-loop control manner.

2. The method according to claim 1, wherein the PCV is controlled in an open-loop control manner as offset control during the VCV closed-loop control mode.

3. A device for controlling pressure in a common rail injection system of an internal combustion engine comprising a high-pressure pump for delivering fuel to a common rail accumulator connected to an injector, a volume control valve (VCV) upstream of the high-pressure pump and configured for adjusting a volume flow of fuel through said volume control valve into the high-pressure pump, and a pressure control valve (PCV) downstream of the high-pressure pump, the control device comprising:

a processor programmed to:

implement a VCV closed-loop control mode for controlling the pressure of fuel in the common rail injection system, wherein in the VCV closed-loop control mode the VCV is controlled in a closed-loop control manner and the PCV is controlled in an open-loop control manner;

upon detecting a predefined operating point of the internal combustion engine, automatically activate a switch to activate a PCV closed-loop control mode while in the VCV closed-loop control mode, wherein both the PCV and the VCV are controlled in a closed-loop control manner;

upon achieving a desired pressure control according to the PCV closed-loop control mode, automatically activate the switch to deactivate the PCV closed-loop control mode, thereby returning to the VCV closed-loop control mode, wherein the VCV is controlled in a closed-loop control manner and the PCV is controlled in an open-loop control manner.

4. The device according to claim 3, wherein the PCV is controlled in an open-loop control manner as offset control during the VCV closed-loop control mode.

5. The device according to claim 3, comprising a common rail pressure coordination block configured to select between the VCV closed-loop control mode and the PCV closed-loop control mode.

6. The device according to claim 3, comprising a pressure control valve coordination block configured to select between the VCV closed-loop control mode and the PCV closed-loop control mode.

7. The device according to claim 6, wherein the pressure control valve coordination block comprises a switch for implementing at least one of a ramp transition and an exponential transition.

8. A system for pressure control of a common rail injection system of an internal combustion engine, comprising:
a high-pressure pump for delivering fuel to a common rail accumulator connected to an injector,
a volume control valve (VCV) which is disposed upstream of the high-pressure pump and configured to adjust a volume flow of fuel through said volume control valve into the high-pressure pump,
a pressure control valve (PCV) downstream of the high-pressure pump, and
a pressure control unit configured to:
implement a VCV closed-loop control mode for controlling the pressure of fuel in the common rail injection system, wherein in the VCV closed-loop control mode the VCV is controlled in a closed-loop control manner and the PCV is controlled in an open-loop control manner;
upon detecting a predefined operating point of the internal combustion engine, automatically activate a switch to activate a PCV closed-loop control mode while in the VCV closed-loop control mode, wherein both the PCV and the VCV are controlled in a closed-loop control manner;
upon achieving a desired pressure control according to the PCV closed-loop control mode, automatically activate the switch to deactivate the PCV closed-loop control mode, thereby returning to the VCV closed-loop control mode, wherein the VCV is controlled in a closed-loop control manner and the PCV is controlled in an open-loop control manner.

9. The system according to claim 8, wherein the PCV is controlled in an open-loop control manner as offset control during the VCV closed-loop control mode.

10. The system according to claim 8, comprising a common rail pressure coordination block configured to select between the VCV closed-loop control mode and the PCV closed-loop control mode.

11. The system according to claim 8, wherein the pressure control unit comprises a pressure control valve coordination block configured to select between the VCV closed-loop control mode and the PCV closed-loop control mode.

12. The system according to claim 11, wherein the pressure control valve coordination block comprises a switch for implementing at least one of a ramp transition and an exponential transition.

* * * * *